United States Patent
Russhard et al.

(10) Patent No.: US 9,016,132 B2
(45) Date of Patent: Apr. 28, 2015

(54) ROTATING BLADE ANALYSIS (75) Inventors: Peter Russhard, Nottingham (GB); Jason D. Back, Derby (GB)

(73) Assignee: Rolls-Royce plc, London (GB)

( * ) Notice: Subject to any disclaimer, the term of this patent is extended or adjusted under 35 U.S.C. 154(b) by 440 days.

(21) Appl. No.: 13/475,285

(22) Filed: May 18, 2012

(65) Prior Publication Data

US 2012/0312099 A1 Dec. 13, 2012

(30) Foreign Application Priority Data

Jun. 10, 2011 (GB) .................................. 1109697.1

(51) Int. Cl.
G01H 11/00 (2006.01)
G01L 7/00 (2006.01)
F01D 21/00 (2006.01)
F01D 17/02 (2006.01)
G01H 1/00 (2006.01)
G01M 15/14 (2006.01)

(52) U.S. Cl.
CPC .............. *F01D 21/003* (2013.01); *F01D 17/02* (2013.01); *G01H 1/003* (2013.01); *G01M 15/14* (2013.01)

(58) Field of Classification Search
USPC ............ 73/660, 659, 593, 583; 702/183, 115, 702/56
See application file for complete search history.

(56) References Cited

U.S. PATENT DOCUMENTS

| 4,426,641 | A | * | 1/1984 | Kurihara et al. | 340/683 |
| 4,481,819 | A | * | 11/1984 | Yoneyama et al. | 73/593 |
| 4,790,189 | A | * | 12/1988 | Twerdochlib | 73/660 |
| 5,974,882 | A | * | 11/1999 | Heath | 73/579 |
| 7,509,862 | B2 | * | 3/2009 | Cohen et al. | 73/660 |
| 8,457,909 | B2 | * | 6/2013 | Russhard | 702/56 |
| 2002/0162395 | A1 | | 11/2002 | Chatellier et al. | |
| 2010/0116044 | A1 | * | 5/2010 | Mitaritonna et al. | 73/147 |

FOREIGN PATENT DOCUMENTS

| EP | 2 136 189 A2 | 12/2009 |
| EP | 2 199 764 A2 | 6/2010 |

OTHER PUBLICATIONS

Menglin et al., "Analysis of Blade Vibration Frequencies from Blade Tip Timing Data," *Proceedings of SPIE*, vol. 7544, pp. 75445F-1 thru 75445F-8, 2010.

* cited by examiner

*Primary Examiner* — Helen Kwok
(74) *Attorney, Agent, or Firm* — Oliff PLC (57) ABSTRACT

A method of analyzing blade displacements detected by circumferentially spaced stationary timing probes associated with an assembly of rotating blades mounted on a rotor, including (a) identifying a possible resonant vibration event in the assembly of rotating blades; (b) zeroing the blade displacements on the rotations identified with the resonant vibration event to remove invariant blade displacements; (c) fitting modelled blade displacements corresponding to possible blade vibrational deflections at various frequencies to the zeroed blade displacements; and (d) characterizing the resonant vibration event by identifying at each rotation the frequency having modelled blade displacements which correlate best with the zeroed blade displacements. Step (c) includes performing at each individual rotation the sub-step of fitting the modelled blade displacements at each frequency to the zeroed blade displacements for successive rotations which include that individual rotation.

11 Claims, 7 Drawing Sheets

◇ probe position
— 3EO

ROTATING BLADE ANALYSIS

FIELD OF THE INVENTION

The present invention relates to the analysis of rotating blades, such as those found in gas turbine engines.

BACKGROUND OF THE INVENTION

Figure 1:
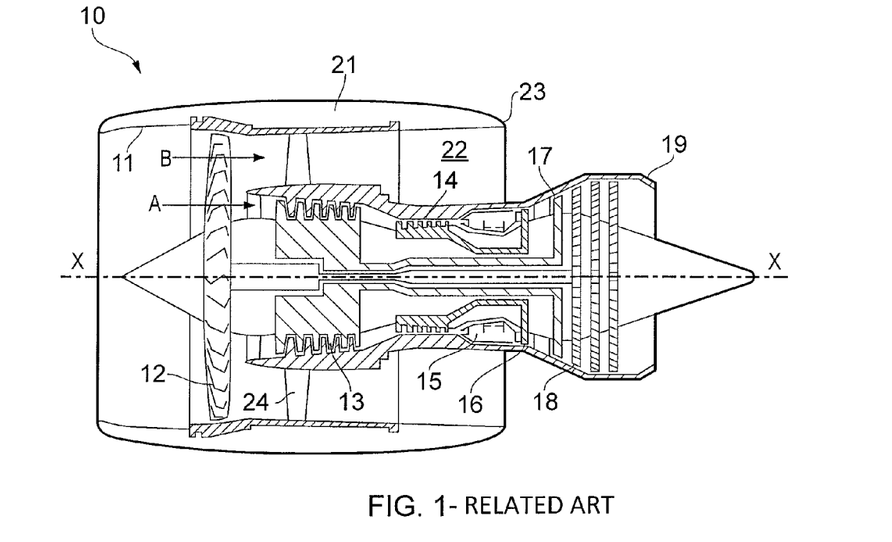
FIG. 1 shows a longitudinal cross-section through a ducted fan gas turbine engine.

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

In the development of gas turbine engines, it is important to determine the amount of vibration of the rotating blades. From vibration measurements, stresses induced in the blades may be determined. Action can then be taken to avoid stresses which are high enough to cause damage to the blades.

As described for example in US patent application no. 2002/0162395, it is known to mount strain gauges on rotating compressor/turbine blades to provide information about the amplitudes and frequencies of vibration of the blades. One or more strain gauges can be provided on each blade, and connected to a radio telemetry system mounted on the rotor, which transmits the measurements from the rotor. However, due to the number of strain gauges required to fully determine the vibrations, the telemetry system is typically complex, expensive, large and time-consuming to install within the rotor.

An alternative technique for characterising blade vibration is "blade tip timing" (BTT) in which non-contact timing probes (e.g. capacitance or optical probes), typically mounted on the engine casing, are used to measure the time at which a blade passes each probe. This time is compared with the time at which the blade would have passed the probe if it had been undergoing no vibration. This is termed the "expected arrival time" and can be calculated from the rotational position of the particular blade on the rotor in conjunction with a "once per revolution" (OPR) signal which provides information about the position of the rotor. The OPR signal is derived from the time at which an indicator on the rotor passes a reference sensor, and its use is well known in the art.

The difference between the expected arrival time and the actual arrival time can be multiplied by the blade tip velocity to give the displacement of the blade from its expected position. Thus BTT data from a particular probe effectively measures blade tip displacement at the probe.

Advantageously, the tip timing method does not require a telemetry system since the probes are mounted on the casing. However, because the sampling rate of the probes is determined by the rotational frequency of the rotor, it is often below the Nyquist frequency for the vibrations of interest. Thus each probe undersamples the vibrations, leading to problems such as aliasing. A further problem with BTT data is that it is often intrinsically noisy due to probe movement caused by mounting restrictions and casing thickness. Nonetheless, with a plurality of timing probes, it is possible, in principle, to perform useful vibration analysis that can be converted into blade stresses.

Conventionally BTT data is separated into two categories: synchronous, where the sample rate is an exact multiple of the signal data; and asynchronous where there is no direct correlation between sample rate and signal data. A synchronous response is an integer multiple of the rotational speed, and is locked to this over a small range of speeds. These are often termed engine order excitations.

Synchronous vibrations manifest themselves as DC shifts in blade position due to the relatively low sampling rate and the vibration occurring at integer multiples of the OPR signal. Synchronous vibrations can be particularly damaging to a rotor blade. A method of analysing BTT data that can be used for identifying resonant synchronous vibration events is described in EP 2199764.

Conventionally, BTT data has been processed, and in particular filtered, differently depending on whether a synchronous and asynchronous analysis is being performed. This can lead to problems with operator filter selection if the analysis is being performed off-line, or to an undesirable reliance on automatic and correct determination of whether a particular response is synchronous and asynchronous if the analysis is being performed online.

Thus it would be desirable to provide an approach for analysing BTT data which can be performed on-line and which does not require a determination of whether a response is synchronous or asynchronous.

SUMMARY OF THE INVENTION

Accordingly, a first aspect of the present invention provides a method of analysing blade displacements detected by a plurality of circumferentially spaced stationary timing probes associated with an assembly of rotating blades mounted on a rotor, the blade displacements corresponding to the times at which the blades pass the respective probes, the method including the steps of:

(a) identifying a possible resonant vibration event in the assembly of rotating blades;

(b) zeroing the blade displacements on the rotations identified with the resonant vibration event to remove invariant blade displacements;

(c) fitting modelled blade displacements corresponding to possible blade vibrational deflections at a plurality of frequencies to the zeroed blade displacements; and (d) characterising the resonant vibration event by identifying at each rotation the frequency having modelled blade displacements which correlate best with the zeroed blade displacements;

wherein step (c) includes performing at each individual rotation identified with the resonant vibration event the sub-step of:

(c-i) fitting the modelled blade displacements at each frequency to the zeroed blade displacements for a plurality of successive rotations which include that individual rotation.

Advantageously, by fitting the modelled blade displacements to the zeroed blade displacements for a plurality of successive rotations, it is possible to perform the same fitting operation for both synchronous and asynchronous responses. Further, the fitting onto an extended number of rotations allows differential filtering procedures for synchronous and asynchronous responses to be dispensed with. This facilitates automated and on-line analysis of BTT data.

The method may have any one or, to the extent that they are compatible, any combination of the following optional features.

In sub-step (c-i), at each rotation the modelled blade displacements may be fitted at each frequency to the zeroed blade displacements for a number of successive rotations determined by the frequency being fitted and the rotational speed. The number can be based upon previous knowledge of historical strain gauge analysis, and typically range from 2 to 20 revolutions. In general, there is an optimum number of rotations for fitting; too low a number provides insufficient fitting accuracy resulting in a non optimum signal to noise ratio, and too low a number leads to loss of temporal resolution in the fitted frequencies leading to a lower calculated amplitude.

Typically, the one or more frequencies include one or more non-integer engine orders, and the modelled blade displacements at the or each non-integer engine order contain angular offsets which compensate for the non-integer part of the engine order in the one or more subsequent rotations.

The one or more frequencies may include one or more integer engine orders.

In sub-step (c-i), respective weights may be applied to the successive rotations to bias the fitting of the model to particular rotations. For example, a greater weight may be applied to the current individual rotation.

In sub-step (c-i), the current individual rotation can be any of the rotations of the successive rotations. However, typically it is the first rotation or the middle rotation.

Conveniently, step (b) may include the sub-steps of:

(b-i) for each timing probe, determining a blade displacement offset which is the average displacement of a predetermined number of blade displacements detected by that probe for the same blade at adjacent rotations of the assembly, all of which rotations are previous to the resonant vibration event, and (b-ii) for each blade displacement on a rotation identified with the resonant vibration event, subtracting the respective blade displacement offset from the blade displacement. Preferably, none of said rotations previous to the event are identified with a resonant vibration event.

The method may further include an initial step of obtaining the blade displacements by detecting the times at which the blades pass the respective probes.

Typically, the probes measure the deflections of the tips of the blades.

Typically, the frequencies of the vibration events are undersampled by the probes.

A second aspect of the present invention provides a method of validating blade displacements detected by a plurality of circumferentially spaced stationary timing probes associated with an assembly of rotating blades mounted on a rotor, the blade displacements corresponding to the times at which the blades pass the respective probes, wherein the method includes:

performing the method of the first aspect; and comparing the frequency or frequencies identified at step (d) with corresponding strain gauge data for the blades.

Another aspect of the present invention provides the use of the method of the first aspect for monitoring rotor blades, e.g. on a rotor of a gas turbine engine. For example, such monitoring can be used to detect variations from normal behaviour, which variations may be associated with faults or dangerous operating conditions.

Further aspects of the present invention provide (i) a computer-based system for performing the method of the first or second aspect, (ii) a computer program for performing the method of the first or second aspect, and (iii) a computer program product carrying a program for performing the method of the first or second aspect. For example, the computer-based system may have one or more processor units configured to perform the method. The computer-based system may have one or more input devices for receiving the blade displacements and/or one or more memory devices for storing the blade displacements. The computer-based system may have one or more output devices and/or display devices for outputting/displaying e.g. identified and/or characterised resonant vibration events

BRIEF DESCRIPTION OF THE DRAWINGS

Embodiments of the invention will now be described by way of example with reference to the accompanying drawings in which:

FIG. 4 shows (a) the output of a conventional synchronous analysis approach on BTT data, and (b) the output of a conventional asynchronous analysis approach on the same BTT data;

FIG. 9 shows plots against rotation number of (a) fitted amplitude, (b) fitted frequency, and (c) correlation with the measured displacements using an approach of fitting both integer and non-integer engine orders to the measured displacements of a given blade over a plurality of successive rotations, the vibration event occurs between revolutions 500 and 1500; and FIG. 10 shows, for the same vibration event as FIG. 9, corresponding plots against rotation number of (a) fitted amplitude, (b) fitted frequency, and (c) correlation with the measured displacements using a comparative approach in which integer and non-integer engine orders are fitted to the measured displacements of the blade, but only for the instant rotation.

DETAILED DESCRIPTION

Figure 2:
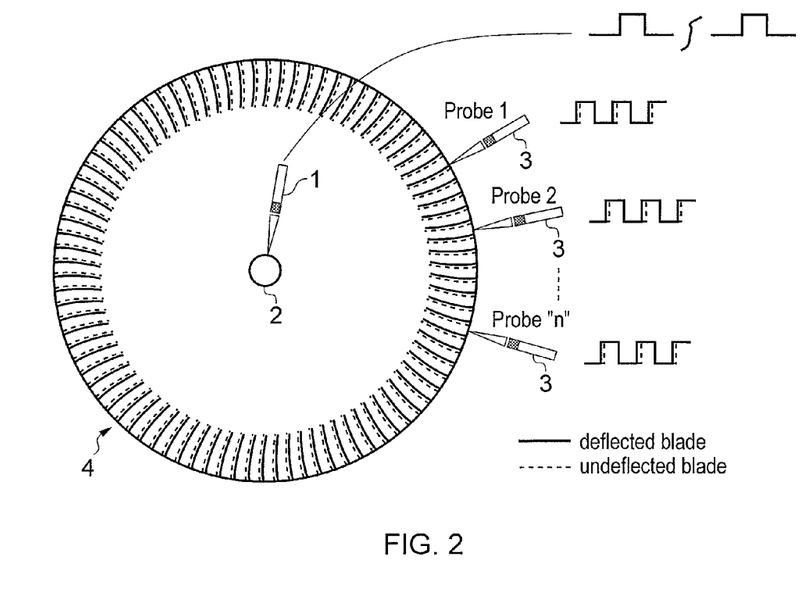
FIG. 2 shows schematically a BTT arrangement.

FIG. 2 shows schematically a BTT arrangement. An OPR probe 1 monitors the position of rotor 2, while 1 to n BTT probes 3 provide timings for blades 4 mounted to the rotor.

Figure 3:
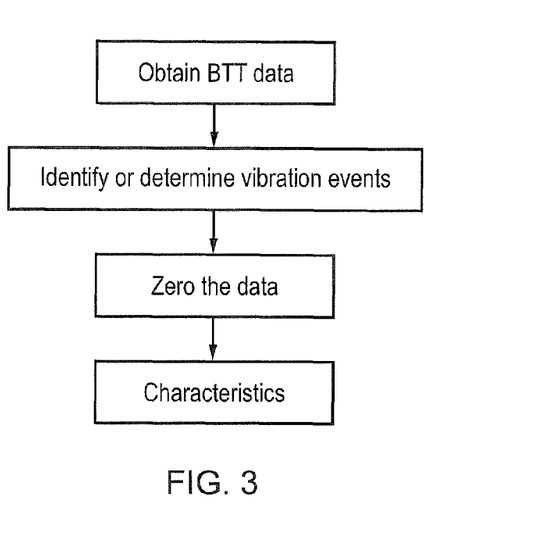
FIG. 3 is a flow chart showing procedural steps in the processing of the timing data obtained by the probes of FIG. 2.

FIG. 3 is a flow chart showing procedural steps in the processing of the timing data obtained by the probes. Firstly, the data is analysed to identify resonant vibration events. Procedures for identify resonant vibration events are discussed in EP 2136189 and EP 2199764. Alternatively, the positions of likely resonant vibration events can be determined from blade modelling (e.g. finite element analysis). Procedures for determining likely resonant vibration events from blade modelling are discussed in EP 2136189. Having identified or determined possible events, the data is zeroed (as discussed below). The data is then ready for characterisation (e.g. quantification of phases and amplitudes) of the vibration events.

The displacement data for each timing probe and each blade can be pre-processed to reject spikes. The zeroing can then proceed by subtracting a blade displacement offset from each displacement inside a possible event. This offset can conveniently be the average displacement of a predetermined number of blade displacements detected by the respective probe for the same blade at adjacent rotations of the assembly, all of which rotations are previous to the resonant vibration event. Thus zeroing is based upon calculating a single average for each probe and each blade combination over a fixed number of rotations, typically 40 but not limited to this. These average blade displacements outside an event are then subtracted from the respective measured displacements inside the event (i.e. the average derived from a given probe/blade combination outside the event is subtracted from the displacements for that probe/blade combination outside the event).

Next, the vibration events data are characterised.

A blade vibration event typically starts as an asynchronous response. As the rotor speed changes this typically becomes synchronous and then as it changes further it returns to asynchronous and eventually decays away. Analysis of BTT data for such an event using a conventional approach requires careful selection of data, and then the application and combination of synchronous and asynchronous analysis techniques.

Figure 4A:
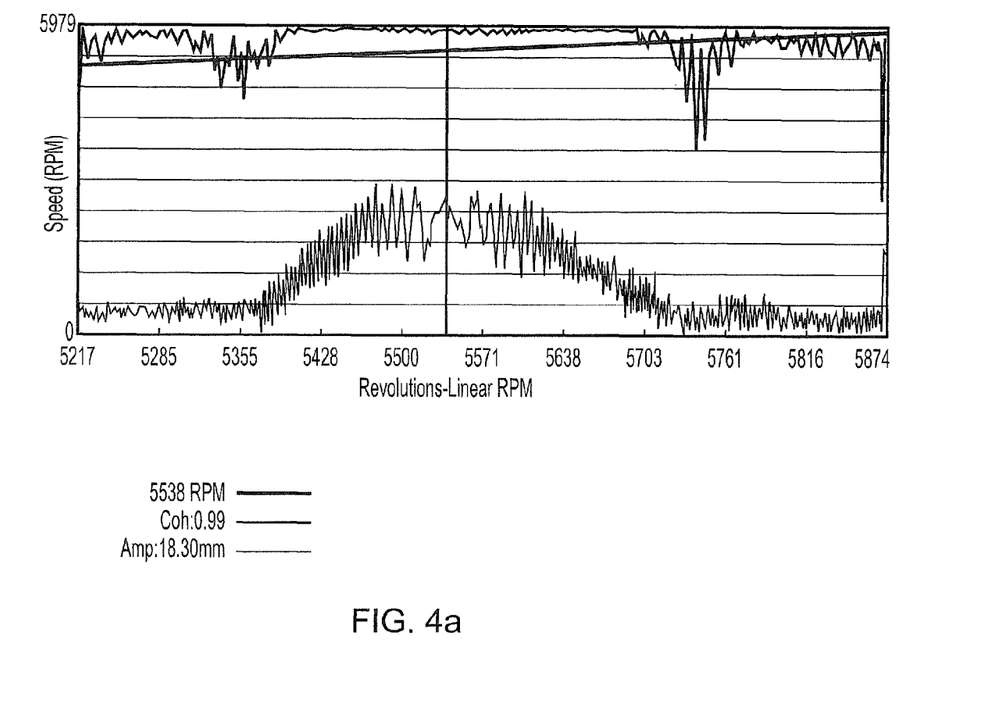
Figure 4B:
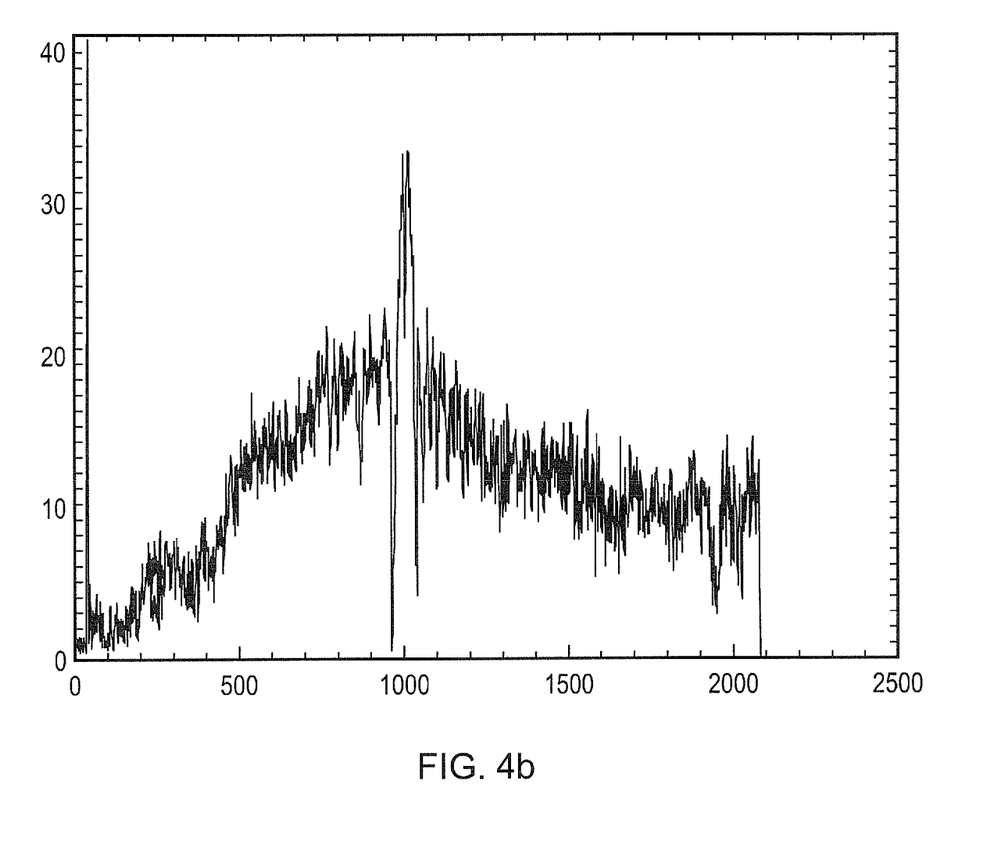

For example, FIG. 4(a) shows the output of a conventional synchronous analysis technique. The output data is only valid at the cursor. FIG. 4(b) then shows the output of a conventional asynchronous analysis technique on the same BTT data. Now the output is valid to either side of the central peak, but not at the peak itself.

Thus, although the two outputs can be appropriately combined and the BTT data properly characterised over the entire event, the conventional procedure is complex and can be difficult to automate.

In contrast, the characterisation approach of the present invention is equally applicable to synchronous and asynchronous vibration events, removing the need to perform and combine separate approaches.

Each BTT datum for an individual blade at a given probe j is of the form:

$$d_j = P_j + a_0 + (a_1 \sin EO\theta_j + a_2 \cos EO\theta_j) + (b_1 \sin feo\theta_j + b_2 \cos feo\theta_j) + noise \quad (1)$$

where $d_j$ is the displacement of that blade measured by probe j; $P_j$ is an invariant blade displacement offset for probe j and is typically due to mechanical variation in the blade positions due to manufacturing tolerances; $\theta_j$ is the angular position of probe j; EO is an integer value engine order for synchronous vibration; $a_0$ is a non-probe specific, steady (i.e. non-vibrational) blade displacement offset due to aerodynamic loading; $a_1$ and $a_2$ are constants from which synchronous vibration amplitude and phase can be calculated; feo is a non-integral (fractional) engine order for asynchronous vibration; and $b_1$ and $b_2$ are constants from which asynchronous vibration amplitude and phase can be calculated.

As the data has been zeroed before the characterisation step, the $P_j$ term is already zero in equation (1). The $a_1$ and $a_2$ terms are a synchronous response and the $b_1$ and $b_2$ terms are an asynchronous response. The $a_0$ term is typically zero at the beginning of a resonant vibration event due to the zeroing procedure, but can vary from that zero value during the event as the aerodynamic loading changes.

Figure 5:
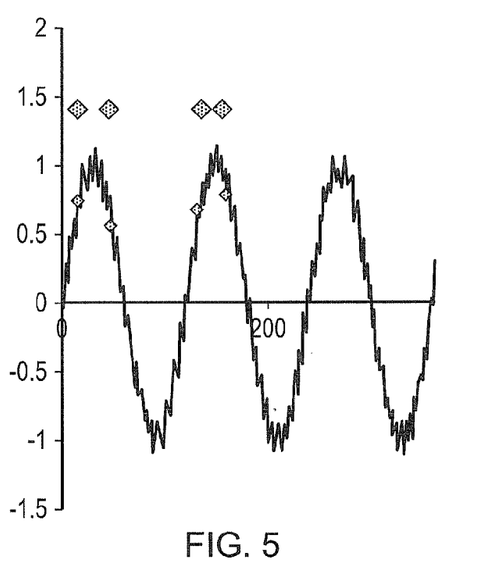
FIG. 5 shows a schematic plot of typically noisy, zeroed, measureable blade displacements against time for a third engine order synchronous vibration over one rotation of the blade, the angular positions of four BTT probes being indicated by the large diamonds.

FIG. 5 shows a schematic plot of typically noisy, zeroed, measureable blade displacements against time for a third engine order synchronous vibration over one rotation of the blade. The angular positions of four BTT probes are indicated by the large diamonds, and the corresponding BTT displacement measurements taken by the probes are indicated by the small diamonds. From these four measurements, the best-fitting third engine order sine wave and its peak amplitude can be calculated. In other words, in the equation above, the $b_1$ and $b_2$ terms are assumed to be zero, and the $a_0$, $a_1$ and $a_2$ terms are calculated. This can be achieved by finding a best fit for $a_0$, $a_1$ and $a_2$ in the following matrix equation:

$$\begin{pmatrix} 1 & \sin EO\theta_1 & \cos EO\theta_1 \\ 1 & \sin EO\theta_2 & \cos EO\theta_2 \\ 1 & \sin EO\theta_3 & \cos EO\theta_3 \\ 1 & \sin EO\theta_4 & \cos EO\theta_4 \end{pmatrix} \begin{pmatrix} a_0 \\ a_1 \\ a_2 \end{pmatrix} = \begin{pmatrix} d_1 \\ d_2 \\ d_3 \\ d_4 \end{pmatrix} \quad (2)$$

Figure 6:
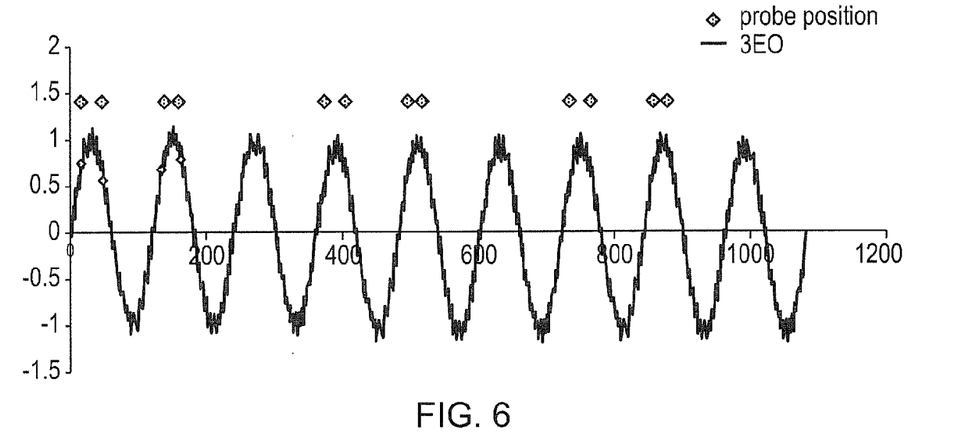
FIG. 6 shows a schematic plot of the same zeroed, measureable blade displacements against time as shown in FIG. 5, but extended to cover the following two blade rotations, the angular positions of the four BTT probes again being indicated by the large diamonds.
Figure 7:
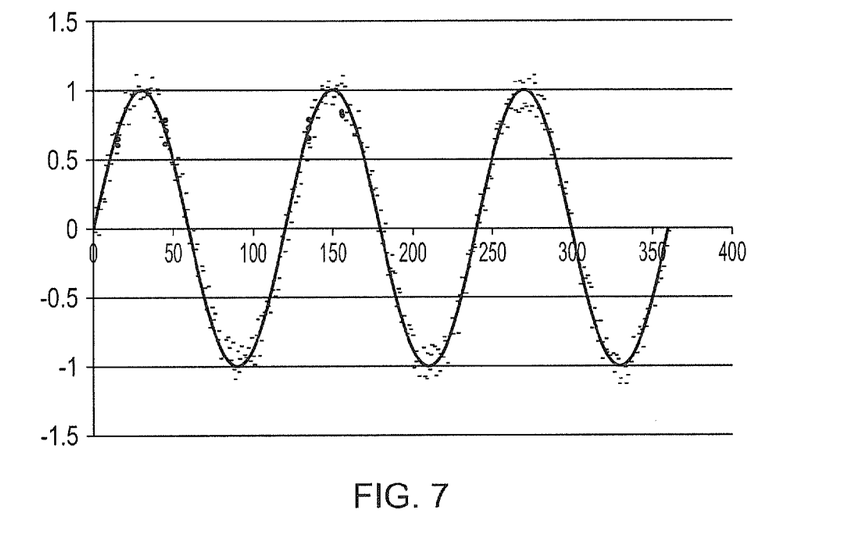
FIG. 7 shows the 12 measurements from the plot of FIG. 6 superimposed into groups for each probe and fitted to a third engine order vibration.

The accuracy of the calculation is, however, determined by the noise on the individual values. By taking measurements from the same probes over a larger number of rotations (for example, FIG. 6 shows 12 measurements from three rotations), it is possible to solve for the $a_0$, $a_1$ and $a_2$ terms to a higher accuracy. FIG. 7 shows the 12 measurements superimposed into four groups (one group for each probe), noting that because the vibration response is synchronous, each probe measures the same displacement value at each rotation, the only variation in measurement at each probe being due to noise only. Below is the corresponding matrix equation:

$$\begin{pmatrix} 1 & \sin EO\theta_1 & \cos EO\theta_1 \\ 1 & \sin EO\theta_2 & \cos EO\theta_2 \\ 1 & \sin EO\theta_3 & \cos EO\theta_3 \\ 1 & \sin EO\theta_4 & \cos EO\theta_4 \\ 1 & \sin EO\theta_1 & \cos EO\theta_1 \\ 1 & \sin EO\theta_2 & \cos EO\theta_2 \\ 1 & \sin EO\theta_3 & \cos EO\theta_3 \\ 1 & \sin EO\theta_4 & \cos EO\theta_4 \\ 1 & \sin EO\theta_1 & \cos EO\theta_1 \\ 1 & \sin EO\theta_2 & \cos EO\theta_2 \\ 1 & \sin EO\theta_3 & \cos EO\theta_3 \\ 1 & \sin EO\theta_4 & \cos EO\theta_4 \end{pmatrix} \begin{pmatrix} a_0 \\ a_1 \\ a_2 \end{pmatrix} = \begin{pmatrix} d_{1,1} \\ d_{2,1} \\ d_{3,1} \\ d_{4,1} \\ d_{1,2} \\ d_{2,2} \\ d_{3,2} \\ d_{4,2} \\ d_{1,3} \\ d_{2,3} \\ d_{3,3} \\ d_{4,3} \end{pmatrix} \quad (3)$$

where $d_{j,n}$ is the displacement of the given blade measured by probe j on rotation n.

Figure 8:
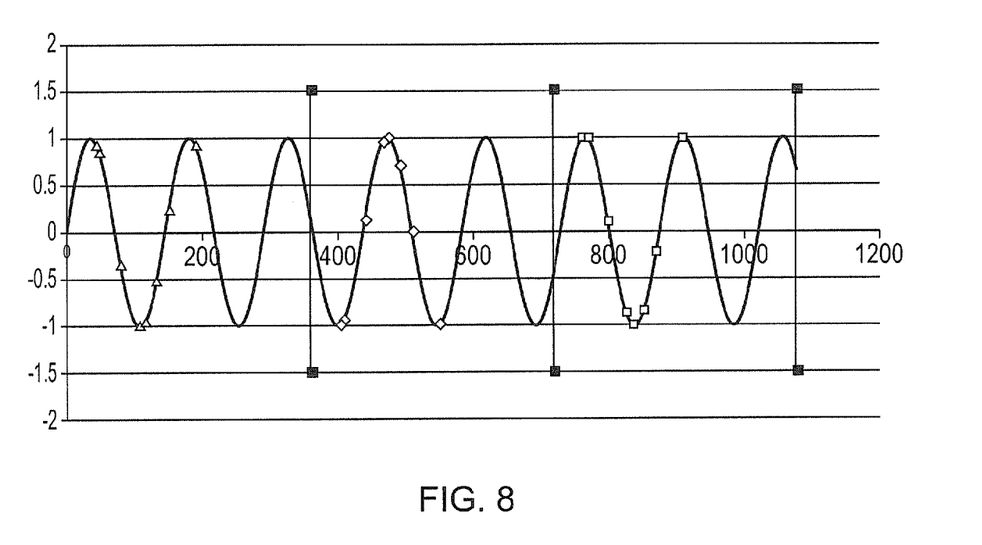
FIG. 8 shows a schematic plot of zeroed blade displacement against time for an asynchronous vibration (fractional engine order of 2.46) over three rotations of the blade, the angular positions of eight BTT probes being shown by measurement points, and the ends of rotations and the beginnings of next rotations being indicated by vertical lines.

A problem arises, however, if the same approach is applied to the characterisation of an asynchronous vibration. FIG. 8 shows a schematic plot of zeroed blade displacement against time for an asynchronous vibration (fractional engine order of 2.46) over three rotations of the blade. The angular positions of eight BTT probes are shown by measurement points, and the ends of rotations and the beginnings of next rotations are indicated by the vertical lines. The values of measured displacement on the first rotation are significantly different to those measured at the same probe on subsequent rotations due to the non-integer period of the blade vibration.

However, an insight behind the present invention was that the approach discussed above in relation to equation (3) can be adapted to characterise asynchronous vibrations without losing the power to characterise synchronous vibrations. More particularly, the approach of fitting a sine wave to the measured displacements for a plurality of rotations can be extended to fractional engine orders if, at each rotation after the first rotation, the values for $\theta_j$ are offset by an amount corresponding to the angular displacement of the measurement points for a given probe between successive rotations. Equation (3) then becomes:

$$\begin{pmatrix} 1 & \sin EO\theta_1 & \cos EO\theta_1 \\ 1 & \sin EO\theta_2 & \cos EO\theta_2 \\ 1 & \sin EO\theta_3 & \cos EO\theta_3 \\ 1 & \sin EO\theta_4 & \cos EO\theta_4 \\ 1 & \sin EO\theta'_1 & \cos EO\theta'_1 \\ 1 & \sin EO\theta'_2 & \cos EO\theta'_2 \\ 1 & \sin EO\theta'_3 & \cos EO\theta'_3 \\ 1 & \sin EO\theta'_4 & \cos EO\theta'_4 \\ 1 & \sin EO\theta''_1 & \cos EO\theta''_1 \\ 1 & \sin EO\theta''_2 & \cos EO\theta''_2 \\ 1 & \sin EO\theta''_3 & \cos EO\theta''_3 \\ 1 & \sin EO\theta''_4 & \cos EO\theta''_4 \end{pmatrix} \begin{pmatrix} a_0 \\ a_1 \\ a_2 \end{pmatrix} = \begin{pmatrix} d_{1,1} \\ d_{2,1} \\ d_{3,1} \\ d_{4,1} \\ d_{1,2} \\ d_{2,2} \\ d_{3,2} \\ d_{4,2} \\ d_{1,3} \\ d_{2,3} \\ d_{3,3} \\ d_{4,3} \end{pmatrix} \quad (4)$$

where EO is an adjacent integer engine order to the actual fractional engine order (i.e. 2 or 3 in the case of an feo=2.46), $\theta_j$ is the angular position of probe j on rotation 1, $\theta'_j$ is the angular position of probe j on rotation 2 offset to compensate for the shift in angular probe position relative to the angular period of the fractional engine order, is the angular position of probe j on rotation 3 offset to compensate for the further shift in angular probe position relative to the angular period of the fractional engine order, and $a_1$ and $a_2$ are constants from which synchronous as well as asynchronous vibration amplitude and phase can be calculated. The angular offset to be applied at each rotation is determined as follows:

$$feo_n = f_m \cdot \frac{1}{n} \sum_1^n \text{rotation\_period} \quad (5)$$

where $feo_n$ is the fractional engine order for the $n^{th}$ rotation, $f_m$ is the frequency being fitted, and rotation_period is the duration of the $n^{th}$ rotation. The fractional (non-integer) part, $NEO_n$, of $feo_n$ is given by:

$$NEO_n = feo_n - \|feo_n\| \quad (6)$$

and the angular offset, $NEO_{offset}$, associated with $NEO_n$ is given by:

$$NEO_{offset} = \frac{2\pi NEO_n}{feo_n} \quad (7)$$

The adjusted angle of the probe, $\theta^{adj}$, to be used for the $n^{th}$ rotation is then given by:

$$\theta^{adj} = \theta + (NEO_{offset} \times n) \quad (8)$$

where θ is the actual angular position of the probe, noting that when $feo_n$ is an integer, the $NEO_{offset}$ becomes zero and $\theta^{adj}$ is just θ. The angular offsets thus compensate for the non-integer part of the engine order in the one or more subsequent rotations.

In general, the greater the number of successive rotations used to fit the engine order, the greater the accuracy of the fitting, although eventually there can be loss of temporal resolution in the fitted orders. However, when BTT data is being compared with strain gauge data, e.g. for validation purposes, one option is to use a number of rotations, n, which corresponds with the characteristic time of the strain gauge measurements. For example, if the strain gauge provides data at a sample rate, SR, has a bandwidth BW and is fast Fourier transformed using x data points, each strain gauge vibrational frequency measurement has a characteristic time, T, given by T=x/(SR·BW). The number of successive rotations for fitting the engine order can then conveniently be selected as n=T·ω/2π.

Thus, in this way, a range of both integer and non-integer engine orders can be fitted to the measured displacements of a given blade for the first rotation in the identified vibration event, the number of orders to be fitted and the width of the range being based, for example, on past experience, knowledge of likely vibrational modes, previous modelling, or other external source. The order which correlates best with the measured displacements best is identified as the order at that rotation. The process is then repeated for the second and subsequent rotations in the identified vibration event. At each repeat, the previous rotation drops out of the fitting calculation and a new rotation is added to the number of successive rotations for the fitting calculation, i.e. a moving window of rotations is used for fitting the engine orders to the measured displacements, the current rotation being at the end of the window such that it leaves the window when the fitting moves to the next rotation.

Figure 9A:
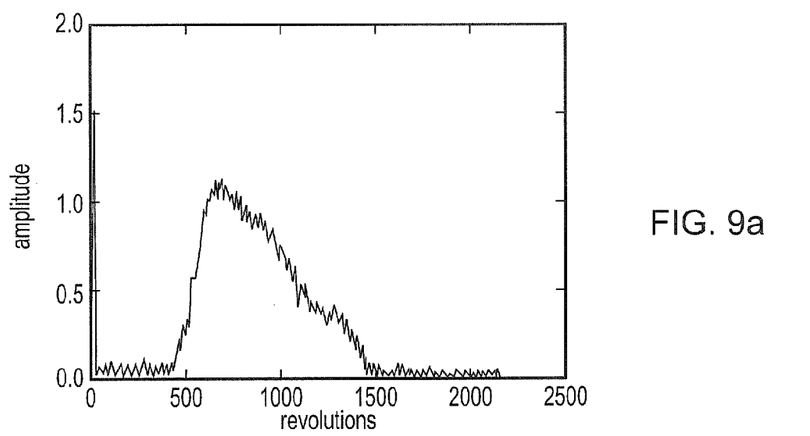
Figure 9B:
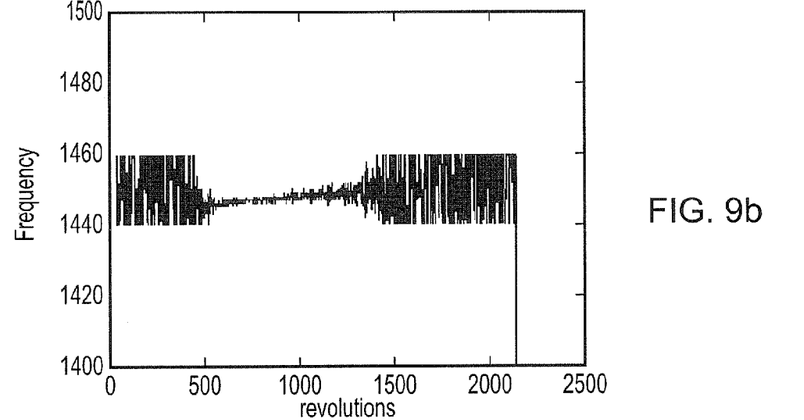
Figure 9C:
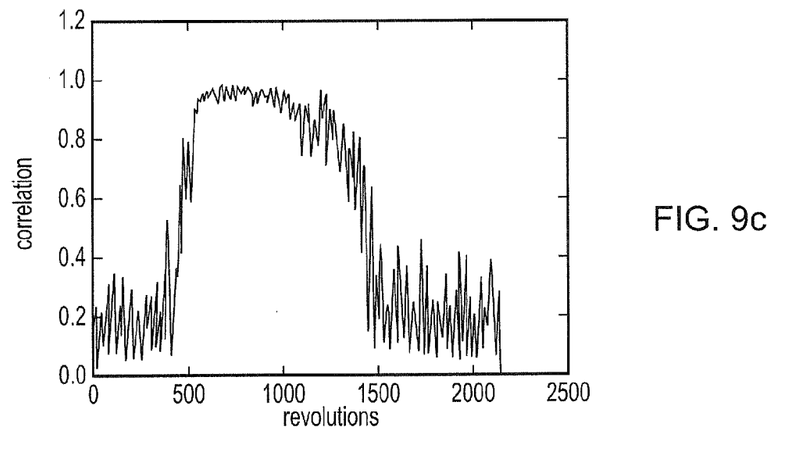
Figure 10A:
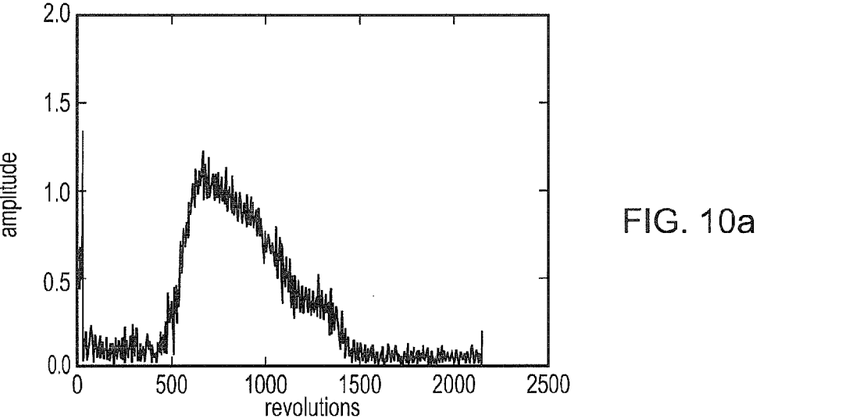
Figure 10B:
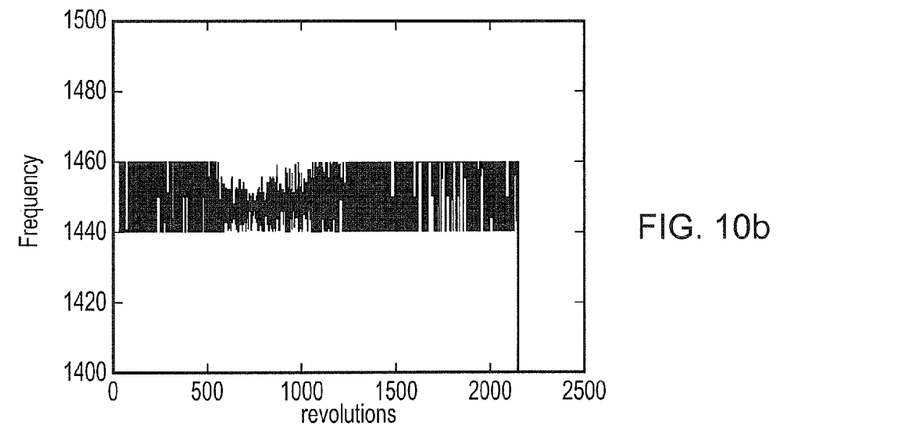
Figure 10C:
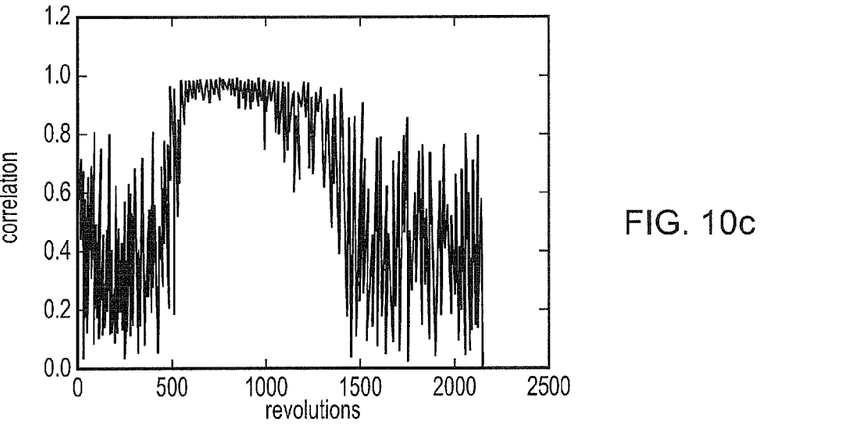

FIG. 9 shows plotted against rotation number (a) the fitted amplitude, (b) the fitted frequency, and (c) the correlation with the measured displacements using the above approach of fitting both integer and non-integer engine orders to the measured displacements of a given blade over a plurality of successive rotations, the vibration event occurs between revolutions 500 and 1500. FIG. 10 shows, for the same vibration event, corresponding plots against rotation number of (a) the fitted amplitude, (b) the fitted frequency, and (c) the correlation with the measured displacements using a comparative approach in which integer and non-integer engine orders are fitted to the measured displacements of the blade, but only for the instant rotation (i.e. so that there is no need to use the angular offsets of equations (4) and (5)). The plots demonstrate the improved ability of the fitting procedure to lock to the blade vibration when the fitting is performed over successive rotations.

As described above, the frequency having modelled blade displacements which correlates best with the zeroed blade displacements is associated with the first rotation in the n successive rotations to which the model is fitted. However, in variants of the approach, the frequency may be associated with a different one of the successive rotations. For example, the frequency may be associated with a middle one of the successive rotations. Additionally or alternatively, weights may be applied to different of the successive rotations to bias the fitting of the model to particular rotations. For example, the current rotation can be given a higher weighting than other rotations.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A method of analysing blade displacements detected by a plurality of circumferentially spaced stationary timing probes associated with an assembly of rotating blades mounted on a rotor, the blade displacements corresponding to the times at which the blades pass the respective probes, the method including the steps of:
   (a) identifying a possible resonant vibration event in the assembly of rotating blades;
   (b) zeroing the blade displacements on the rotations identified with the resonant vibration event to remove invariant blade displacements;
   (c) fitting modelled blade displacements corresponding to possible blade vibrational deflections at a plurality of frequencies to the zeroed blade displacements; and
   (d) characterising the resonant vibration event by identifying at each rotation the frequency having modelled blade displacements which correlate best with the zeroed blade displacements;

wherein step (c) includes performing at each individual rotation identified with the resonant vibration event the sub-step of:
   (c-i) fitting the modelled blade displacements at each frequency to the zeroed blade displacements for a plurality of successive rotations which include that individual rotation.

2. A method according to claim 1, wherein the plurality of frequencies include one or more non-integer engine orders, and the modelled blade displacements at the or each of the one or more non-integer engine orders contain angular offsets which compensate for a non-integer part of the one or more engine orders in one or more subsequent rotations.

3. A method according to claim 1, wherein the plurality of frequencies include one or more integer engine orders.

4. A method according to claim 1, wherein in sub-step (c-i) respective weights are applied to the successive rotations to bias a fitting of the model to particular rotations.

5. A method according to claim 1, wherein step (b) includes the sub-steps of:
   (b-i) for each timing probe, determining a blade displacement offset which is the average displacement of a predetermined number of blade displacements detected by that probe for the same blade at adjacent rotations of the assembly, all of which rotations are previous to the resonant vibration event, and
   (b-ii) for each blade displacement on a rotation identified with the resonant vibration event, subtracting the respective blade displacement offset from the blade displacement.

6. A method according to claim 5, wherein none of said rotations previous to the resonant vibration event are identified with a resonant vibration event.

7. A method of validating blade displacements detected by a plurality of circumferentially spaced stationary timing probes associated with an assembly of rotating blades mounted on a rotor, the blade displacements corresponding to the times at which the blades pass the respective probes, wherein the method includes:
   performing the method of claim 1; and
   comparing the frequency or frequencies identified at step (d) with corresponding strain gauge data for the blades.

8. A method according to claim 1, further including the initial step of obtaining the blade displacements by detecting the times at which the blades pass the respective probes.

9. A computer-based system for performing the method of claim 1.

10. A computer program, stored on a non-transitory computer-readable medium, that, when executed, performs the method of claim 1.

11. A computer program product comprising a non-transitory computer-readable medium having a program stored thereon for performing the method of claim 1.

* * * * *